Oct. 31, 1933.  F. HOFMANN ET AL  1,933,434
PRODUCTION OF HYDROCARBON OILS
Filed March 28, 1929
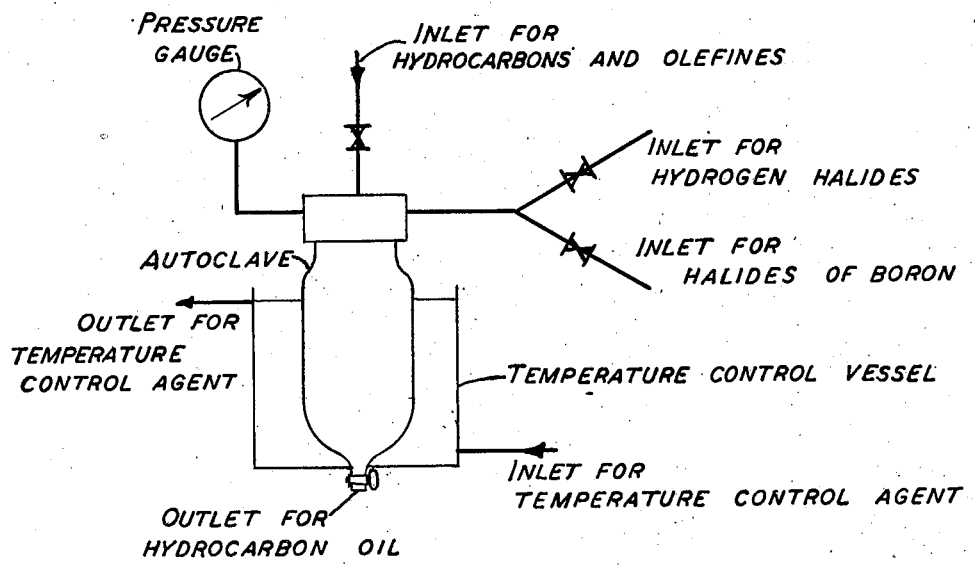
INVENTORS.
FRITZ HOFMANN
CARL WULFF.
BY Hauff Warland
ATTORNEYS.

Patented Oct. 31, 1933

1,933,434

UNITED STATES PATENT OFFICE

1,933,434

PRODUCTION OF HYDROCARBON OILS

Fritz Hofmann and Carl Wulff, Breslau, Germany, assignors to I. G. Farbenindustrie Aktiengesellschaft, Frankfort - on - the - Main, Germany, a corporation of Germany Application March 28, 1929, Serial No. 350,802, and in Germany April 5, 1928

12 Claims. (Cl. 196—78)

This invention relates to an improved process for the production of hydrocarbon oils by condensation of hydrocarbons, in particular cyclic hydrocarbons with olefines.

We have found that in the production of hydrocarbon oils by treatment of hydrocarbons, and in particular of cyclic hydrocarbons with olefines at an elevated temperature and, if desired, under pressure, in the presence of an anhydrous halide of a solid element which halide gives rise to an evolution of heat when treated with water, the process is considerably accelerated and at the same time particularly valuable products, such as highly alkylated hydrocarbons, are obtained if the process be carried out with an addition of a hydrogen halide, such as hydrogen fluoride, hydrogen chloride, hydrogen bromide, hydrogen iodide or of a substance supplying hydrogen halides, such as an organic halogen compound.

Thus, for example, if naphthalene be treated in an autoclave, which is preferably rotary, with anhydrous aluminium chloride and a gaseous hydrogen halide, for example, hydrogen chloride, be pressed thereinto at a pressure of between about 2 and 3 atmospheres and ethylene be then introduced into the autoclave at a pressure of about 50 atmospheres, the reaction at once takes place with evolution of heat, and may be rapidly completed by heating to a temperature of between about 50° and 300° C. It may in some cases be advisable to press further quantities of ethylene into the autoclave, until the said gas is only taken up by the reaction mixture very slowly. On opening the autoclave a greenish oil is obtained from the naphthalene whilst the aluminium chloride is balled together in the form of a tacky lump. The composition of the oil obtained is dependent on the temperature of the reaction, the amount of the catalyst and the amount of ethylene employed. Thus, for example, when working at about 130° C., mainly mono- or dialkylated naphthalenes are obtained, whereas when working at 250° C. products alkylated to a higher degree are obtained.

The oil can simply be poured off, while the aluminium chloride remains in the autoclave and can be employed over again. On distilling the reaction products 5 to 10 per cent of hydrocarbons of the nature of benzene pass over up to about 200° C., besides halogenated hydrocarbons, ethyl chloride and butyl chloride having been detected in the said mixture. On distilling further in vacuo 10 to 25 per cent of mobile oils distill over, the remainder boiling in vacuo at 4mm between about 160° and 350° C., and not even traces of naphthalene are present. The distillate boiling up to about 160° C. in vacuo (5 mm), consists mainly of ethyl or diethyl and other mono- or dialkyl naphthalenes. The flash point of these products lies below 150° and 160° C. The main fractions consist of highly alkylated naphthalenes comprising oils of high viscosity, which have a flash point above 180° C. In place of naphthalene other aromatic hydrocarbons, such as benzene or the homologues thereof or hydroaromatic hydrocarbons, such as tetrahydronaphthalene or mixtures of hydrocarbons, such as crude tar oils or the oils obtained by destructive hydrogenation of distillable carbonaceous materials may be employed with advantage.

Ethylene, propylene and the like, as such or as mixtures, or cyclohexene or olefines which are already present in the initial materials, such as in the products obtained by destructive hydrogenation of distillable carbonaceous materials may be employed as olefines for the purposes of the present invention.

As examples of the anhydrous halides employed as catalysts in accordance with the present invention may be mentioned besides aluminium chloride other anhydrous metal halides, such as aluminium bromide, zinc chloride, tetrachloride, iron chloride and the like and in particular the halides of boron, the activity of which has been found to be considerably increased by operating with an addition of hydrogen halides or of compounds capable of splitting off hydrogen halides, such, for example, as halogenated hydrocarbons.

Suitable apparatus for carrying out our invention is illustrated in the accompanying drawing, each element of which is identified by a descriptive legend which makes further description thereof unnecessary. In operation the hydrocarbon to be treated with the olefine is introduced into the autoclave at the designated inlet; then the boron halide and the hydrogen halide are introduced, the latter being introduced under the pressure desired. The temperature of the autoclave is regulated by a suitable temperature control agent, such as, oil, mercury, hot gases or any other agent having a suitable temperature. Thereafter, the olefine is introduced at the designated point, if desired, under pressure. After the condensation is complete, the remaining hydrogen halide and olefine can be drawn off through the same ports that were used for inlets and the oil resulting from the condensation is drawn off through a pipe controlled by a suitable valve.

The following examples will further illustrate how the said invention may be carried out in practice, but the invention is not limited thereto. The parts are by weight.

Example 1

100 parts of naphthalene are introduced together with 10 parts of boron chloride into an autoclave whereupon butylene is pressed in until a pressure of 50 atmospheres is established. The whole is then heated for about 6 hours to a temperature between 50° and 60° C. After cooling down the content of the autoclave is washed with water, dried and distilled in vacuo. In addition to first runnings 60 parts of a viscous lubricating oil are obtained.

Example 2

300 parts of naphthalene are treated as in Example 1, but with 10 atmospheres of boron fluoride, 10 atmospheres of hydrogen chloride and 48 atmospheres of ethylene at about 200° C. In this case the reaction is carried out in a stationary autoclave. After the pressure has three times been increased to 45 atmospheres, the reaction becomes slower. 700 parts of an oil of similar composition to that obtained according to Example 1 are produced. The catalyst is recovered by condensation.

Example 3

80 grams of benzene are brought into reaction in an autoclave having a capacity of 500 ccm with 120 grams of butylene in an atmosphere of hydrogen chloride introduced under a pressure of about 10 atmospheres and further 10 atmospheres of boron fluoride. The autoclave is heated up by the heat evolved by the reaction itself and after several hours the reaction comes to a standstill. 190 grams of liquid products are thus obtained. The lower fractions thereof consist mainly of halogenated hydrocarbons, which may be employed for further reactions. Hardly any benzene is present at all. With the viscous oils of high boiling point, which are obtained to the extent of about 60 per cent, analyses and molecular weights are obtained, which correspond to those required for tri- and tetrabutyl benzene.

Example 4

93 parts of benzene and 82 parts of cyclohexene are treated as in Example 2 with boron fluoride and hydrogen chloride. 120 parts of an oil are obtained having a boiling point of 120° to 300° C. at 10 mm mercury gauge. The analysis corresponds to a product consisting of benzene substituted several times by cyclohexyl radicles.

Example 5

150 parts of tetrahydronaphthalene are treated as in Example 2 with ethylene, boron fluoride and hydrogen chloride. Liquid products are obtained having a composition similar to that of the products obtained according to Example 1.

Example 6

150 parts of an oil obtained by destructive hydrogenation of distillable carbonaceous materials, which have a boiling point at 10 mm mercury gauge of between about 60° and 150° C., are treated with boron fluoride and hydrogen chloride at a temperature of about 250° C. The oils thus obtained consist to the extent of about 50 per cent of highly viscous products.

Example 7

100 parts of toluene are treated at 50° C. with butylene in the presence of boron bromide while adding hydrogen bromide. After about 6 hours the conversion is complete. The resulting products, after purification, yield an oil of which 55 per cent may be employed as lubricating oil.

Example 8

150 parts of a product of destructive hydrogenation of distillable carbonaceous materials are treated together with 50 parts of ethylene in the manner described in Example 6. 150 parts of viscous oils are thus obtained.

Example 9

500 parts of solid crude anthracene are treated at about 250° C. and under a pressure of 100 atmospheres together with ethylene, boron fluoride and hydrogen chloride. After about 3 hours no further appreciable decrease in the pressure takes place. About 800 parts of an oil are thus obtained consisting to the extent of about 50 per cent of highly viscous lubricating oils.

Example 10

500 parts of naphthalene are brought into an autoclave together with 30 parts of anhydrous hydrogen fluoride. About 3 atmospheres of boron fluoride and 150 atmospheres of ethylene are pressed into the reaction vessel. The absorption of the ethylene proceeds rapidly at temperatures varying between room temperature and 100° C. 1000 parts of a highly viscous oil are obtained, the boiling point of which lies considerably above that of the initial materials, the analysis of which shows that these consist of highly alkylated naphthalenes.

Example 11

500 parts of crude naphthalene and 30 parts of phenol are treated with boron fluoride and hydrogen chloride, as a catalyst, and with ethylene. The reaction is considerably accelerated by the addition of phenol. The products obtained are similar to those obtained according to Example 1.

What we claim is:—

1. In the production of hydrocarbon oils by condensation of unsaturated cyclic hydrocarbons together with gaseous olefines, the step of carrying out the reaction at a temperature between ordinary temperature and 300° C. with an addition of hydrogen halide and of a halide of boron.

2. In the production of hydrocarbon oils by condensation of unsaturated cyclic hydrocarbons together with gaseous olefines, the step of carrying out the reaction at a temperature between ordinary temperature and 300° C. with an addition of hydrogen halide and of a halide of boron, and operating under pressure.

3. A process for the production of hydrocarbon oils by condensing olefines and hydrocarbons which comprises treating an aromatic hydrocarbon together with ethylene at a temperature between ordinary temperature and 300° C. and under pressure with an addition of hydrogen chloride and boron fluoride.

4. In the production of hydrocarbon oils by condensation of unsaturated cyclic hydrocarbons with gaseous olefines the step of carrying out the reaction with an addition of hydrogen halide and of a halide of boron, and operating under an elevated pressure and at a temperature of between 50° and 300° C.

5. In the production of hydrocarbon oils by condensation of unsaturated cyclic hydrocarbons together with gaseous olefines, the step of carrying out the reaction at a temperature between ordinary temperature and 300° C. with an addition of hydrogen halide and of a halide of boron.

6. In the production of hydrocarbon oils by condensation of unsaturated cyclic hydrocarbons together with ethylene, the step of carrying out the reaction with an addition of hydrogen halide and of a halide of boron and operating at a temperature between ordinary temperature and 300° C. and under pressure.

7. In the production of hydrocarbon oils from olefines and hydrocarbons which comprises treating naphthalene together with ethylene under pressure with an addition of hydrogen chloride and boron fluoride and heating to about 200° C.

8. In the production of hydrocarbon oils by condensation of unsaturated cyclic hydrocarbons with gaseous olefines the step of carrying out the reaction with an addition of hydrogen halide and of a halide of boron, and operating under an elevated pressure and at a temperature of between 50° and 300° C.

9. In the production of a hydrocarbon oil by the condensaiton of a cyclic hydrocarbon, containing a double bond, with a gaseous olefine, the step of carrying out the reaction at a temperature between ordinary temperature and 300° C. with an addition of hydrogen halide and a halide of boron.

10. In the production of a hydrocarbon oil by the condensation of a cyclic hydrocarbon, containing a double bond, with a gaseous olefine, the step of carrying out the reaction with an addition of hydrogen halide and of a halide of boron and operating under pressure at a temperature between 50° and 300° C.

11. In the production of hydrocarbon oils by condensation of aromatic hydrocarbons together with gaseous olefines, the step of carrying out the reaction at a temperature between ordinary temperature and 300° C. with an addition of hydrogen halide and of a halide of boron.

12. In the production of hydrocarbon oils by condensation of aromatic hydrocarbons with gaseous olefines, the step of carrying out the reaction with an addition of hydrogen halide and of a halide of boron, and operating under an elevated pressure and at a temperature of between 50° and 300° C.

FRITZ HOFMANN.
CARL WULFF.